US011027602B1

(12) United States Patent
Amble

(10) Patent No.: US 11,027,602 B1
(45) Date of Patent: Jun. 8, 2021

(54) TRI-FOLD TONNEAU COVER USABLE OUTSIDE OF VEHICLE

(71) Applicant: Toyota Motor Engineering & Manufacturing North America, Inc., Plano, TX (US)

(72) Inventor: Bruce Amble, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 12 days.

(21) Appl. No.: 16/698,331

(22) Filed: Nov. 27, 2019

(51) Int. Cl.
  *B60J 7/14* (2006.01)
  *B60J 7/16* (2006.01)
  *B60P 7/02* (2006.01)

(52) U.S. Cl.
  CPC ............... *B60J 7/141* (2013.01); *B60J 7/14* (2013.01); *B60J 7/1607* (2013.01); *B60P 7/02* (2013.01)

(58) Field of Classification Search
  CPC ............ B60J 7/14; B60J 7/141; B60J 7/1607; B60P 7/02
  USPC ............. 296/100.02, 100.06, 100.08, 100.09
  See application file for complete search history.

(56) References Cited

U.S. PATENT DOCUMENTS

| | | | |
|---|---|---|---|
| 4,747,441 A * | 5/1988 | Apolzer | B60J 7/041 160/206 |
| 4,807,921 A * | 2/1989 | Champie, III | B60J 7/068 160/235 |
| 7,014,400 B1 | 3/2006 | LaBelle et al. | |
| 9,211,834 B2 | 12/2015 | Facchinello et al. | |
| 9,682,733 B2 | 6/2017 | Krishnan et al. | |
| 9,925,853 B2 * | 3/2018 | Aubrey | B60J 7/141 |
| 2003/0085585 A1 | 5/2003 | Dicke | |
| 2003/0193209 A1 | 10/2003 | Melvani | |
| 2016/0031305 A1 * | 2/2016 | Bernardo | B60J 10/277 296/100.03 |

\* cited by examiner

*Primary Examiner* — Jason S Daniels
(74) *Attorney, Agent, or Firm* — Christopher G. Darrow; Darrow Mustafa PC

(57) ABSTRACT

A tonneau cover structured to cover a pickup truck cargo bed includes a first cover panel having an exterior surface along a first side of the first cover panel. A transition cover panel is connected to the first cover panel so as to be rotatable with respect to the first cover panel about a first axis of rotation, to both a first side of a first reference plane and a second side of the first reference plane opposite the first side of the first reference plane. A second cover panel is rotatably connected to the transition cover panel so as to be rotatable with respect to the transition cover panel about a second axis of rotation to both a first side of a second reference plane also to a second side of the second reference plane opposite the first side of the second reference plane.

10 Claims, 8 Drawing Sheets

TRI-FOLD TONNEAU COVER USABLE OUTSIDE OF VEHICLE

TECHNICAL FIELD

The present invention relates to covers for vehicle cargo beds and, more particularly, to a tonneau cover for a cargo bed which includes a storage cavity and which is usable for other purposes when detached from the vehicle.

BACKGROUND

A folding tonneau cover may be used to cover a cargo bed of a vehicle and may be folded as stored when not in use. However, such a cover may have no use other than as a tonneau cover.

SUMMARY

In one aspect of the embodiments described herein, a tonneau cover structured to cover a pickup truck cargo bed is provided. The tonneau cover includes a first cover panel having an exterior surface along a first side of the first_cover panel. A transition cover panel is connected to the first cover panel so as to be rotatable with respect to the first cover panel about a first axis of rotation, to a first side of a first reference plane extending through the first cover panel parallel to the first cover panel exterior surface and through the first axis of rotation, and so as to enable the transition cover panel to be rotatable to a second side of the first reference plane opposite the first side of the first reference plane. A second cover panel is rotatably connected to the transition cover panel so as to be rotatable with respect to the transition cover panel about a second axis of rotation, to a first side of a second reference plane extending through both the first axis of rotation and the second axis of rotation, and also to a second side of the second reference plane opposite the first side of the second reference plane.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
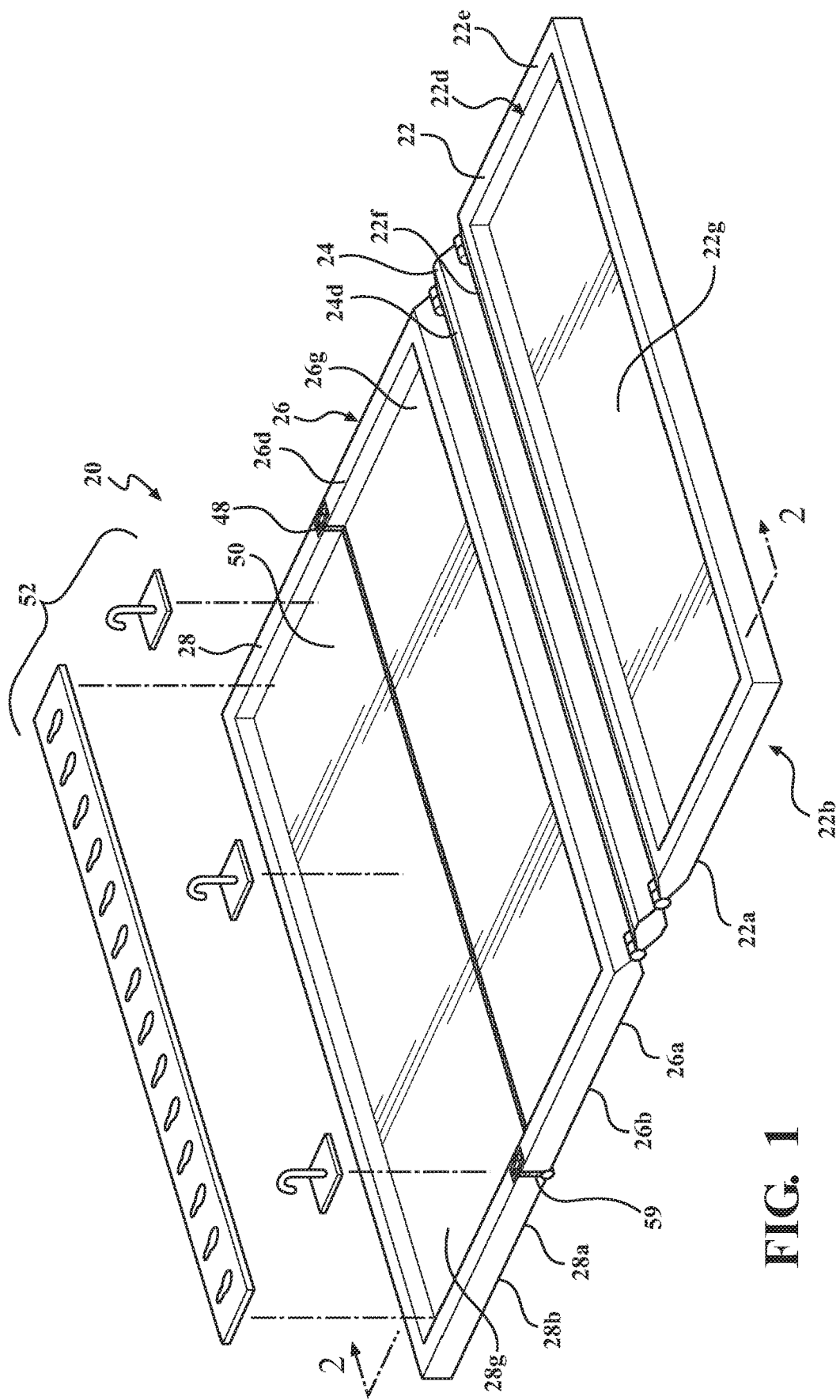
FIG. 1 is a schematic perspective view of a tonneau cover in accordance with an embodiment described herein, oriented so as to show an underside of the cover designed to face into a vehicle cargo bed when the cover is mounted on the vehicle so as to cover the cargo bed.

Embodiments described herein relate to a tonneau cover structured to cover a pickup truck cargo bed. An embodiment of the cover may include a first cover panel, a transition cover panel rotatably coupled to the first cover panel, a second cover panel rotatably coupled to the transition cover panel, and a third cover panel rotatably coupled to the second cover panel. The transition cover panel may be coupled to the first cover panel so as to be rotatable to either side of a plane extending through the first cover panel, and secured in a rotated position with respect to the first cover panel. The second cover panel may be coupled to the transition cover panel so as to be rotatable to either side of a plane extending through the transition cover panel, and secured in a rotated position with respect to the transition cover panel. These features enable the tonneau cover to be reconfigured from a flat shape suitable for covering the cargo bed, to any of a variety of different shapes which may be usable for purposes other than a conventional tonneau cover. In addition, the second and third cover panels may each include a storage cavity on sides of the panels designed to face the cargo bed. These storage cavities may be combined into a single, continuous storage cavity for relatively long items, such as rifles or fishing rods. The second and third panels may be secured with respect to each other so as to remain straight, thereby maintaining the continuous storage cavity. If not used for other purposes, the cover may be folded and stowed.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 2:
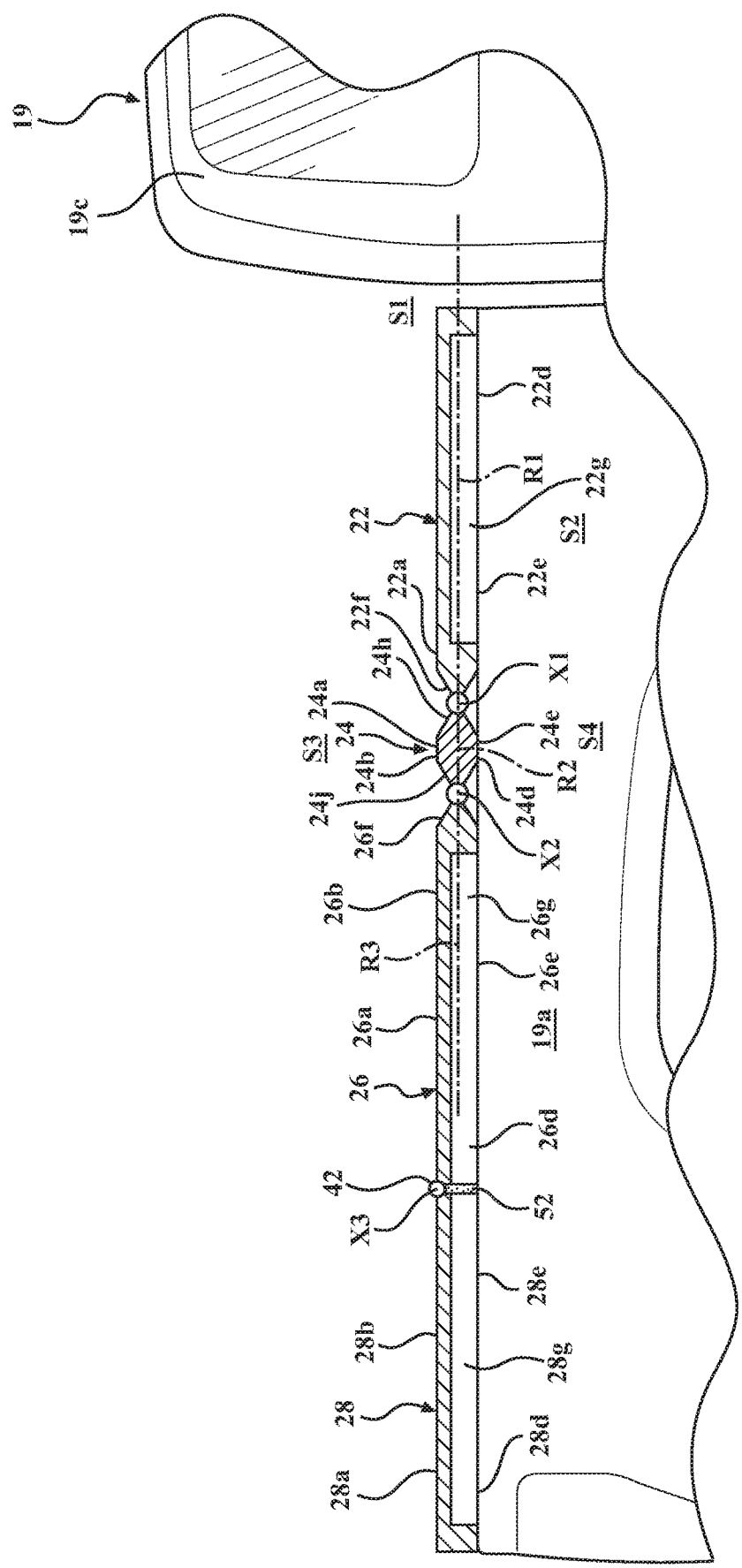
FIG. 2 is a schematic cross-sectional side view of the tonneau cover shown in FIG. 1, shown mounted on a pickup truck so as to cover a cargo bed of the pickup truck.

FIG. 1 is a schematic perspective view of a tonneau cover 20 in accordance with an embodiment described herein, oriented so as to show an underside of the cover designed to face into a vehicle cargo bed when the cover is mounted on a vehicle so as to cover the cargo bed. FIG. 2 is a schematic cross-sectional side view of the tonneau cover 20 shown in FIG. 1, shown mounted on a vehicle in the form of a pickup truck 19 so as to cover a cargo bed 19a of the pickup truck. In one or more arrangements, tonneau cover 20 may include a first cover panel 22, a transition cover panel 24, a second cover panel 26, and a third cover panel 28.

First cover panel 22 may be structured to be securable to the cargo bed sidewalls just behind the truck cab 19c when the cover 20 is used as a conventional tonneau cover to cover the entire cargo bed 19a. First cover panel 22 may have an exterior surface 22a along a first side 22b of the first cover panel. The exterior surface 22a may be a surface facing away from the cargo bed 19a when the tonneau cover 20 is mounted to the truck 19 in a conventional manner so as to cover the cargo bed 19a, as shown in FIG. 2.

In one or more arrangements, the first cover panel 22 may be formed from a single piece of material such as a molded polymer to include an exterior surface 22a positioned along the first side 22b of the first cover panel 22 and an inner portion 22d residing on a second side 22e of the first cover panel 22 opposite the first side 22b. The inner portion 22d may face toward the cargo bed 19a when the tonneau cover 20 is mounted to the truck 19 so as to cover the cargo bed 19a. In other arrangements (not shown), the first cover panel 22 may be formed from an outer shell and a separate inner portion secured to the outer shell, with the outer shell defining the first side 22b including the exterior surface 22a, and the inner portion 22d residing on a second side 22e of the first cover panel 22 opposite the first side 22b.

The tonneau cover panels described herein may be formed from any suitable material or materials, such as polymers and/or metallic materials. When used as a conventional tonneau cover, the various panels of the tonneau cover 20 may be attached to the walls of the cargo bed 19a using any suitable conventional tonneau cover attachment methods, for example, bolts, clamps, etc.

Figure 4:
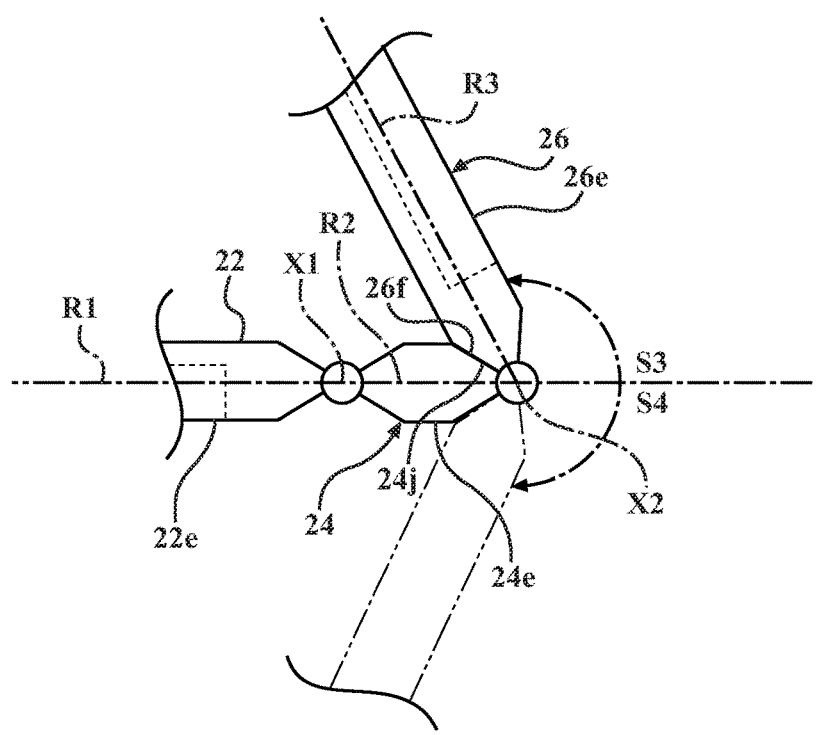
FIG. 4 is a detail view of a portion of the tonneau of FIG. 2, showing a range of rotation of the second cover panel with respect to the transition cover panel.

In one or more arrangements, the first cover panel exterior surface 22a may be structured to extend horizontally when the tonneau cover 20 is mounted to the truck 19 in a conventional manner so as to cover the cargo bed 19a, as shown in FIG. 2. In one or more arrangements, an end 22f of the first cover panel may be tapered as shown in FIGS. 1 and 4 to enable rotation of a transition cover panel 24 with respect to the first cover panel 22 as described herein. In particular embodiments, the first cover panel 22 may include a cavity 22g provided in the inner portion 22d. The first cover panel cavity 22g may be used as described herein for mounting items therein when the tonneau cover 20 is used in a conventional manner and/or when the cover is used for other purposes as described herein.

Transition cover panel 24 may be connected to the first cover panel 22 so as to be rotatable with respect to the first cover panel 22 about a first axis of rotation X1. The transition cover panel 24 may facilitate arrangement of the various panels into one or more of the configurations described herein, so that the tonneau cover 20 can be used for purposes other than covering the cargo bed 19a in a conventional manner.

The transition cover panel 24 may be rotatable to a first side S1 of a first reference plane R1 extending parallel to the first cover panel exterior surface 22a and through the first axis of rotation X1, and so as to enable the transition cover panel 24 to be rotatable to a second side S2 of the first reference plane R1 opposite the first side S1 of the first reference plane R1. Transition cover panel 24 may have an exterior surface 24a along a first side 24b of the transition cover panel 24. The exterior surface 24a may be a surface facing away from the cargo bed 19a when the tonneau cover 20 is mounted to the truck 19 in a conventional manner so as to cover the cargo bed 19a, as shown in FIG. 2.

In one or more arrangements, the transition cover panel 24 may be formed from a single piece of material such as a molded polymer to include exterior surface 24a positioned along the first side 24b of the transition cover panel 24 and an inner portion 24d residing on a second side 24e of the transition cover panel 24 opposite the first side 24b. The inner portion 24d may face toward the cargo bed 19a when the tonneau cover 20 is mounted to the truck 19 so as to cover the cargo bed 19a. In other arrangements (not shown), the transition cover panel 24 may be formed from an outer shell and a separate inner portion secured to the outer shell, with the outer shell defining the first side 24b including the exterior surface 24a, and the inner portion 24d residing on the second side 24e of the transition cover panel 24 opposite the first side 24b.

Figure 3:
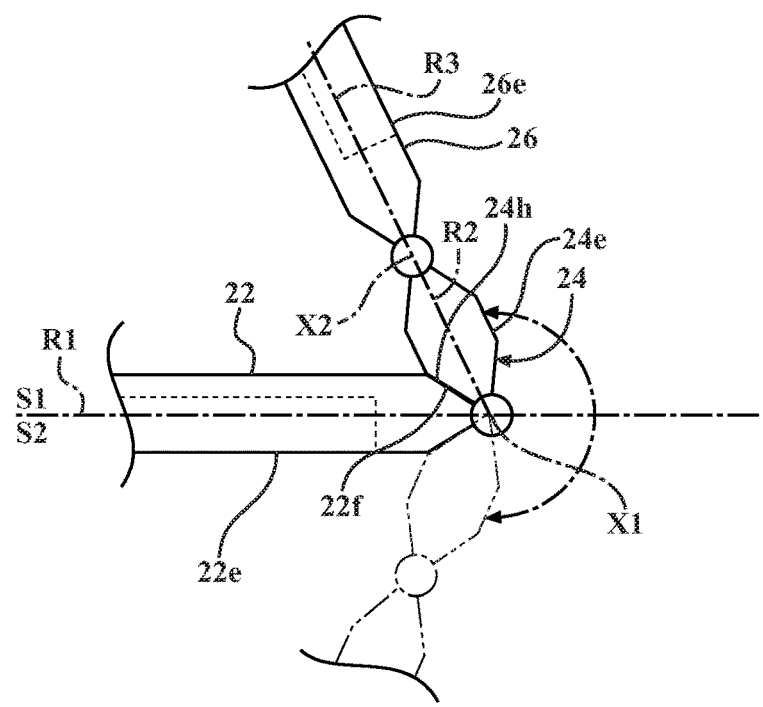
FIG. 3 is a detail view of a portion of the tonneau of FIG. 2, showing a range of rotation of the transition cover panel with respect to the first cover panel.

To enable rotation of the transition cover panel 24 with respect to the first cover panel 22 as described herein, a first end 24h of the transition cover panel may be tapered as shown. When the transition cover panel 24 is rotated with respect to the first cover panel 22 as shown in FIG. 3, the adjacent tapered portions 22f of the first cover panel 22 and 24h of the transition cover panel 24 may contact each other to define limits of rotation. Also, to enable rotation of the transition cover panel 24 with respect to the second cover panel 26 as described herein, a second end 24j of the transition cover panel 24 may be tapered as shown. When the transition cover panel 24 is rotated with respect to the second cover panel 26 as shown in FIG. 3, the tapered second end 24j of the transition cover panel 24 and an adjacent tapered end 26f of the second cover panel 26 (described below) and may contact each other to define limits of rotation.

Second cover panel 26 may be rotatably connected to the transition cover panel 24 so as to be rotatable with respect to the transition cover panel 24 about a second axis of rotation X2. The second cover panel 26 may be rotatable to a first side S3 of a second reference plane R2 extending through both the first axis of rotation X1 and the second axis of rotation X2, and also to a second side S4 of the second reference plane R2 opposite the first side S3 of the second reference plane R2.

In one or more arrangements, the tonneau cover 20 is structured so that the first and second reference planes R1, R2 are coplanar or substantially coplanar when the tonneau cover 20 is mounted to the pickup truck 19 so as to cover the cargo bed 19a. As used herein, the term "substantially" includes exactly the term it modifies and slight variations therefrom. Thus, the term "substantially coplanar" means exactly coplanar and slight variations therefrom. In this particular example, slight variations therefrom can include within normal manufacturing tolerances for the dimensions and materials used in fabricating and assembling the tonneau cover. In one or more arrangements, due to normal manufacturing tolerances, the reference planes may be substantially coplanar within 0.2 inches or less.

Second cover panel 26 may have an exterior surface 26a along a first side 26b of the second cover panel 26. The exterior surface 26a may be a surface facing away from the cargo bed 19a when the tonneau cover 20 is mounted to the truck 19 in a conventional manner so as to cover the cargo bed 19a, as shown in FIG. 2. In one or more arrangements, the second cover panel 26 may be formed from a single piece of material such as a molded polymer to include exterior surface 26a positioned along a first side 26b of the second cover panel 26 and an inner portion 26d residing on a second side 26e of the second cover panel 26 opposite the first side 26b. The inner portion 26d may face toward the cargo bed 19a when the tonneau cover 20 is mounted to the truck 19 so as to cover the cargo bed 19a. In other arrangements, the second cover panel 26 may be formed from an outer shell and a separate inner portion secured to the outer shell, with the outer shell defining the first side 26b including the exterior surface 26a, and the inner portion 26d residing on a second side 26e of the second cover panel 26 opposite the first side 26b.

To enable rotation of the second cover panel 26 with respect to the transition cover panel 24 as described herein, a first end 26f of the second cover panel 26 may be tapered as shown. When the second cover panel 26 is rotated with respect to the transition cover panel 24 as shown in FIG. 4, the adjacent tapered portions of the second cover panel 26 and the transition cover panel 24 may contact each other to define limits of rotation.

The second cover panel 26 may include a cavity 26g provided in the inner portion 26d. The second cover panel cavity 26g may be used as described herein for mounting items therein when the tonneau cover 20 is used in a conventional manner and/or when the cover 20 is used for other purposes as described herein. Seals formed from flexible flaps (not shown) may be positioned over the rotational junctions between the panels described herein. Such flaps may be formed from, for example, a thin rubber material designed to serve as a barrier against intrusion of moisture and dirt into the seams between the panels.

Referring to FIG. 3, in particular embodiments, the transition cover panel 24 may be connected to the first cover panel 22 so as to enable the transition cover panel 24 to be rotated to the first side S1 of the first reference plane R1 so as to form an angle of at least 120° between the first reference plane R1 and the second reference plane R2, and so as to enable the transition cover panel 24 to be rotated to the second side S2 of the first reference plane R1 so as to form an angle of at least 120° between the first reference plane R1 and the second reference plane R2.

A securement mechanism 32 may be structured to enable securement of the transition cover panel 24 in a rotational position along the first side S1 of the first reference plane R1, and also to enable securement of the transition cover panel 24 in a rotational position along the second side S2 of the first reference plane R1. A "rotational position" of the transition cover panel 24 may be an angular orientation of the transition cover panel 24 with respect to the first reference plane R1 (i.e., an orientation of the transition cover panel 24 in which an angle (zero or non-zero) is formed between the second reference plane R2 and the first reference plane R1). For example, FIG. 2 shows the transition cover panel 24 in a rotational position in which a 0° is formed between the second reference plane R2 and the first reference plane R1. Also, FIG. 3 shows the transition cover panel 24 in a rotational position in which a non-zero is formed between the second reference plane R2 of the transition cover panel and the first reference plane R1.

Figure 5:
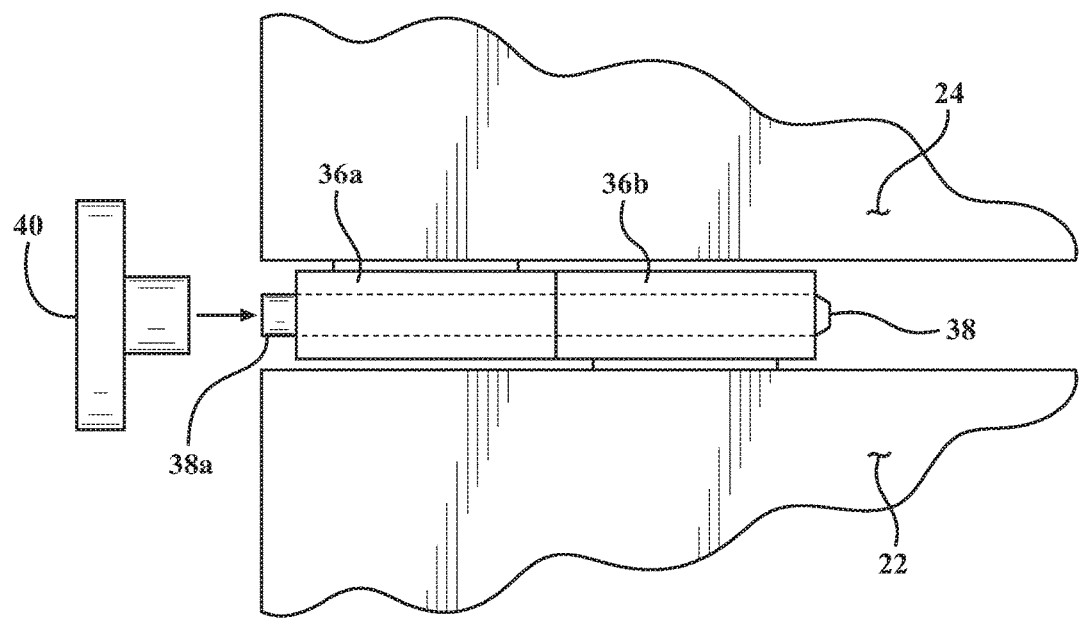
FIG. 5 is a detail view of a portion of the tonneau cover of FIGS. 1 and 2, showing an embodiment of a hinge arrangement usable for rotationally connecting the transition cover panel to the first cover panel and for connecting the second cover panel to the transition cover panel.

Referring to FIG. 5, in one or more arrangements, the transition cover panel 24 and the first cover panel 22 may be connected along tapered edges thereof by one or more hinge elements 36, such as conventional interleaved hinge elements usable for connecting doors to door frames. In one or more arrangements, a bolt 38 having a threaded end 38a may be inserted into holes defined by the hinge elements 36a and 36b after the first cover panel 22 and the transition cover panel 24 have been arranged so as to align the holes. An end of the bolt near the bolt head may be dimensioned to form an interference fit with hinge element 36b, to retain the bolt in the hinge element. End 38a of the bolt 38 may extend past an end of an outer hinge element 36a. A handwheel 40 may include a threaded interior portion (not shown) structured to mateably engage the end 38a of the bolt 38.

To secure the transition cover panel 24 in a desired rotational position with respect to the first cover panel 22, the transition cover panel 24 (or the first cover panel 22) may be rotated to a desired rotational position. The handwheel 40 may then be applied to the end 38a of bolt 38. When the handwheel 40 is applied to the end 38a of the bolt and turned, the handwheel 40 may contact and be tightened against the end of the outer hinge element 36a. As the handwheel 40 is tightened, the hinge elements 36a, 36b are pressed between the handwheel 40 and the head of the bolt 38, thereby increasing the contact force between the hinge elements, bolt and handwheel. This may secure the transition cover panel 24 in the desired rotational position with respect to the first cover panel 22. Alternatively, another suitable securement mechanism may be used.

Figure 13A:
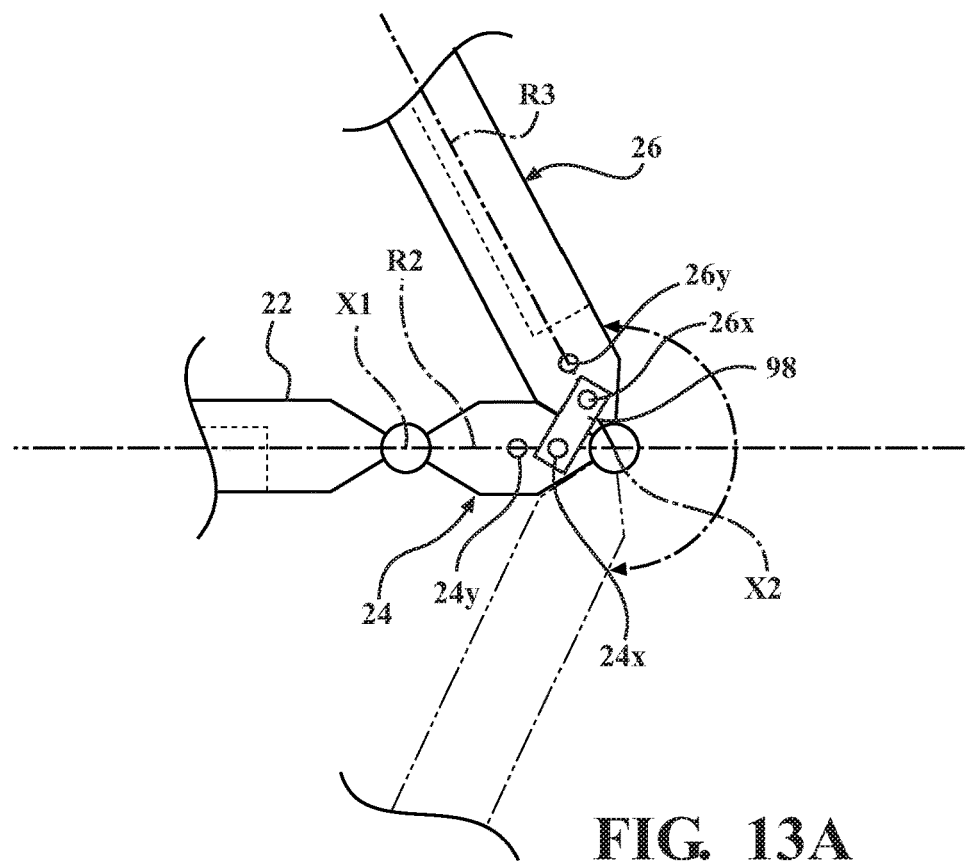
FIG. 13A is a detail view of a portion of the tonneau cover of FIGS. 1 and 2, showing an embodiment of a mechanism for securing adjacent cover panels with respect to each other in a one exemplary rotational arrangement.
Figure 13B:
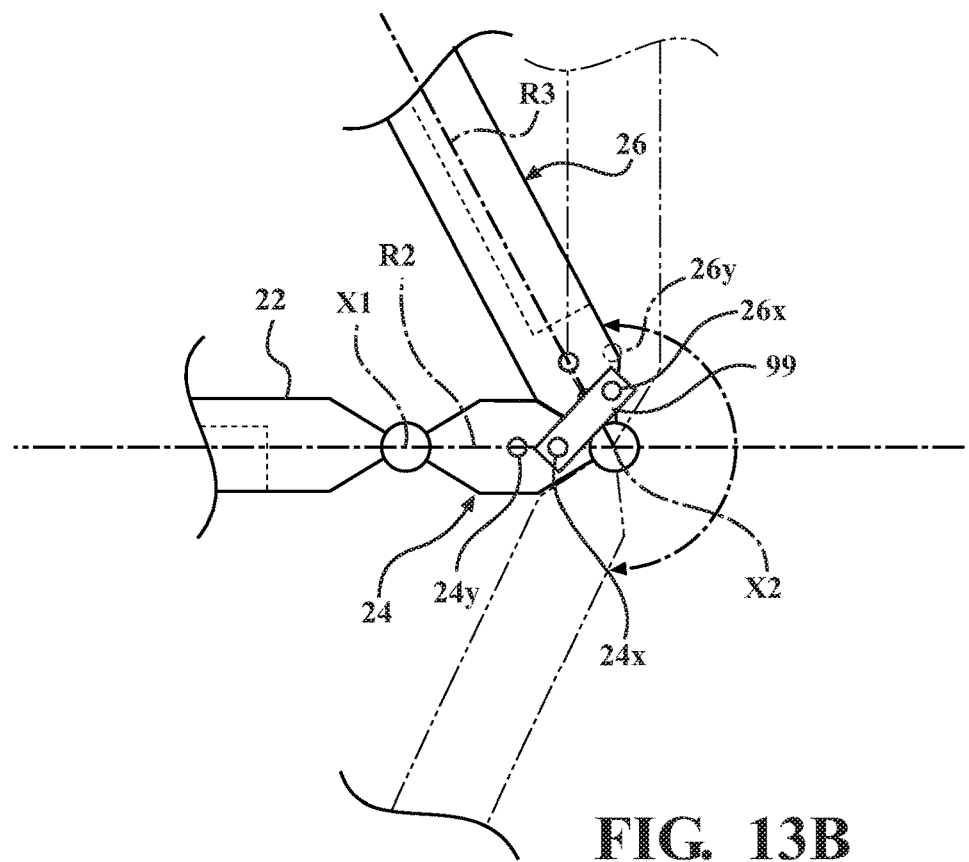
FIG. 13B is a detail view of the tonneau cover of FIG. 1 and showing the securement mechanism of FIG. 13A used to secure adjacent cover panels with respect to each other in another exemplary rotational arrangement.

Referring to FIGS. 13A and 13B (similar in perspective to FIG. 4), in an alternative securement method, adjacent panels may be connected using hinge elements as previously described. In addition, multiple collinear holes may be formed along the panel reference planes, to enable securement of the panels at various discrete angles using suitable brackets. For example, holes such as 24x, 24y may be formed in transitional panel 24 along plane R2 and holes such as 26x, 26y may be formed in second panel 26 along plane R3. In FIG. 13A, a bracket 98 may include holes designed to overlay associated ones of holes 24x, 24y and 26x, 26y when the panels 24 and 26 are in particular desired rotational positions with respect to each other as shown. When the panels are arranged angularly as shown, holes in bracket 98 may be aligned with holes in the panels 24, 26 and pins (not shown) inserted into the bracket holes and panel holes to secure the bracket 98 to the panels 24, 26. The bracket 98 then holds the panels in the orientations shown. To hold the panels 24, 26 in different orientations (for example, at a 90° with respect to each other), the panels 24, 26 may be arranged as shown in FIG. 13B (with a new position of panel 26 shown in phantom) and the procedure just described may be used with another bracket 99 (or different holes formed in the same bracket 98 shown in FIG. 13A) to secure the bracket to panels holes 24x and 26x, thereby maintaining the panels 24, 26 in the orientations shown in FIG. 13B. This mechanism may be used to secure adjacent panels at rotational positions in which the panels reside at discrete angles (e.g., 90°) with respect to each other.

Referring again to FIG. 2, a third reference plane R3 may be defined so as extend through the second axis X2 of rotation and the second cover panel 26 and so as to be substantially coplanar with the second reference plane R2 when the tonneau cover 20 is mounted to the pickup truck 19 so as to cover the cargo bed 19a.

Referring to FIG. 4, in particular embodiments, the second cover panel 26 may be connected to the transition cover panel 24 so as to enable the second cover panel 26 to be rotated to the first side S3 of the second reference plane R2 so as to form an angle of at least 120° between the second reference plane R2 and the third reference plane R3, and to be rotated to the second side S4 of the third reference plane R3 so as to form an angle of at least 120° between the second reference plane R2 and the third reference plane R3.

A securement mechanism as previously described (for example, incorporating the interleaved door hinges 36a, 36b and handwheel 40) may be used to secure the second cover panel 26 in a desired rotational position with respect to the transition cover panel 24, as described herein. Alternatively, another suitable securement mechanism may be used.

Referring to FIGS. 1 and 2, third cover 28 panel may be connected to the second cover panel 26 so as to be rotatable with respect to the second cover panel 26 about a third axis of rotation X3. Third cover panel 28 may have an exterior surface 28a along a first side 28b of the third cover panel. The exterior surface 28a may be a surface facing away from the cargo bed 19a when the tonneau cover 20 is mounted to the truck 19 in a conventional manner so as to cover the cargo bed, as shown in FIG. 2.

In one or more arrangements, the third cover panel 28 may be formed from a single piece of material such as a molded polymer to include exterior surface 28a positioned along the first side 28b of the third cover panel 28 and an inner portion 28d residing on a second side 28e of the third cover panel 28 opposite the first side 28b. The inner portion 28d may face toward the cargo bed 19a when the tonneau cover 20 is mounted to the truck 19 so as to cover the cargo bed 19a. In other arrangements (not shown), the third cover panel 28 may be formed from an outer shell and a separate inner portion secured to the outer shell, with the outer shell defining the first side 28b including the exterior surface 28a, and the inner portion 28d residing on a second side 28e of the third cover panel 28 opposite the first side 28b.

Figure 6:
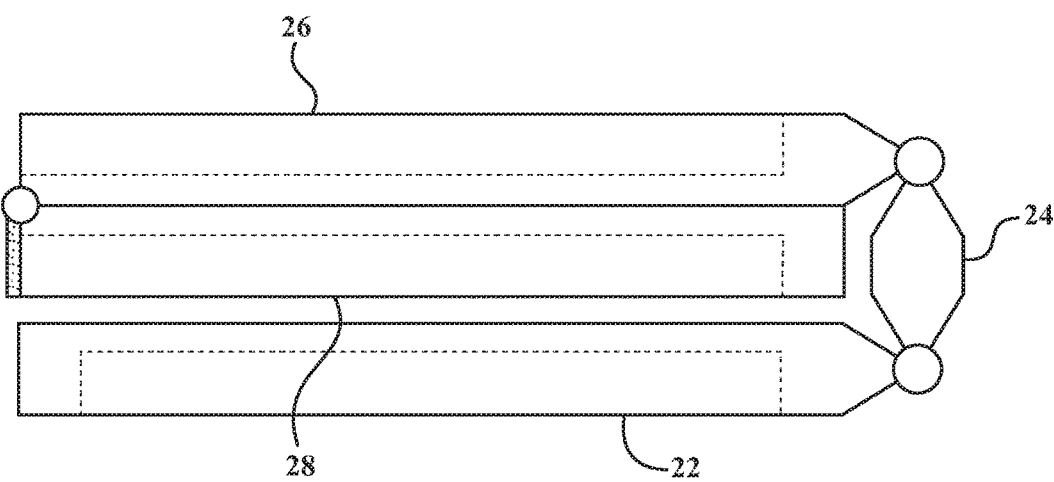
FIG. 6 is a schematic side view of the tonneau cover of FIGS. 1 and 2 showing the cover in a folded configuration for stowage.

One or more conventional hinges 42 may be provided adjacent the second and third cover panel exterior surfaces 26a, 28a to enable folding of the tonneau cover second and third cover panels 26, 28 as shown in FIG. 6.

The third cover panel 28 may include a cavity 28g provided in the inner portion 28d. The third cover panel cavity 28g may be used as described herein for mounting items therein when the tonneau cover 20 is used in a conventional manner and/or when the cover is used for other purposes as described herein.

A securement mechanism may be structured to enable securement of one of the second cover panel 26 and the third cover panel 28 with respect to the other one of the second cover panel 26 and the third cover panel 28 so as to prevent rotation of the one of the second cover panel 26 and the third cover panel 28 with respect to the other one of the second cover panel 26 and the third cover panel 28. In one or more arrangements, a conventional latching mechanism 48 may be used to secure the second cover panel 26 and the third cover panel 28 with respect to each other in the configuration shown in FIGS. 1 and 2.

Referring to FIGS. 1 and 2, the second cover panel cavity 26g and the third cover panel cavity 28g may be structured so as to form a single continuous cavity 50 extending along and between the second cover panel second side 26e and the third cover panel second side 28e when the second cover panel 26 and the third cover panel 28 are secured with respect to each other so as to form an extended straight portion of the tonneau cover 20 as shown. This single continuous cavity 50 is relatively larger than a cavity which may be accommodated in a single one of the second cover panel 26 and the third cover panel 28. This enables relatively larger and/or longer items to be mounted and secured within the cavity 50. For example, relatively long items such as rifles may be mounted in the single continuous cavity 50.

To facilitate attachment of items to the tonneau cover 20 within the single continuous cavity 50, various detachable hooks, brackets, and other attachments (generally designated 52) may be provided. These attachments may be screwed or press-fit into suitable holes formed in a floor of the cavity 50. Velcro® strips may also be attached to the floor of cavity 50 for securing items in the cavity. The holes and/or attachment locations for these features may be positioned so as to maximize flexibility of positioning of the features, to help configure the attachment features to enable securement of a wide variety of items in the tonneau cover cavity 50.

Referring to FIG. 2, a compressive weather seal 59 may be positioned in a seam between the second cover panel 26 and the third cover panel 28. Seal 59 may be formed from a rubber or other deformable material, to aid in preventing moisture from seeping into the cargo bed through the tonneau cover 20.

In one or more arrangements, the tonneau cover 20 is structured to be foldable as shown in FIG. 6. Transition cover panel 24 may be dimensioned so as to enable the other cover panels 22, 26, 28 to fold as shown in a stacked configuration for stowage, for example, in the cargo bed 19a or behind seats in the truck cab 19c.

Figure 7:
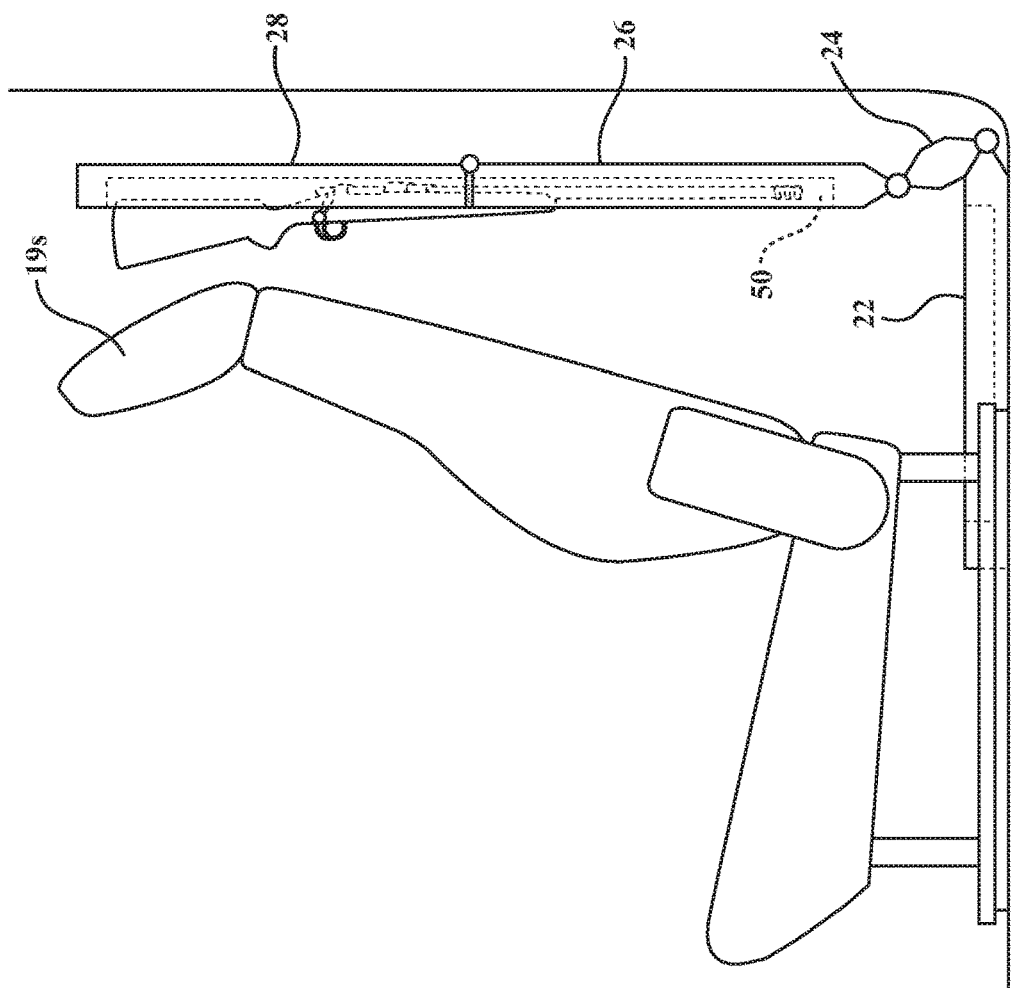
FIG. 7 is a schematic side view of the tonneau cover of FIGS. 1 and 2 showing the cover in a first alternative end-use configuration.

Referring to FIG. 7, in one or more arrangements, the tonneau cover 20 may be structured so that first cover panel 22 and transition cover panel 24 may be securable in the relationship shown, with first cover panel 22 acting as a base of a stand which may be rested on a floor of the truck cab behind seat(s) 19s in the cab 19c. Second and third cover panels 26, 28 may be secured by latches 48 to form a continuous straight portion of the tonneau cover, thereby enabling items to be stored in the single continuous cavity 50 provided. The continuous cavity 50 may face in a forward direction of the vehicle to enable access to items mounted in the cavity.

Figure 8:
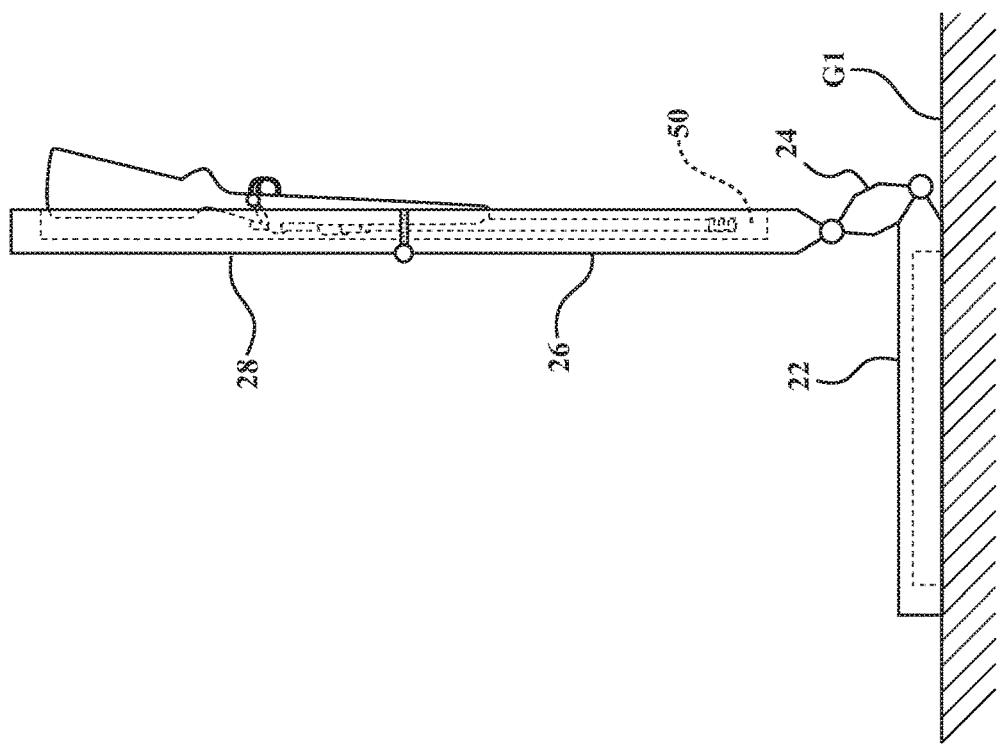
FIG. 8 is a schematic side view of the tonneau cover of FIGS. 1 and 2 showing the cover in a second alternative end-use configuration.

Referring to FIG. 8, in an arrangement similar to that shown in FIG. 7, the tonneau cover 20 may be configurable for use when removed from the truck 19. First cover panel 22 and transition cover panel 24 may be secured in the relationship shown, with first cover panel 22 acting as a base of a stand which may be rested on a ground surface G1 away from the truck 19. Second and third cover panels 26, 28 may be secured by latches 48 to form a continuous straight portion of the tonneau cover, thereby enabling items to be stored in the single continuous cavity 50 provided. The continuous cavity 50 may face in a direction opposite that shown in FIG. 7 to provide convenient access to items (such as guns) mounted in the cavity.

Figure 9:
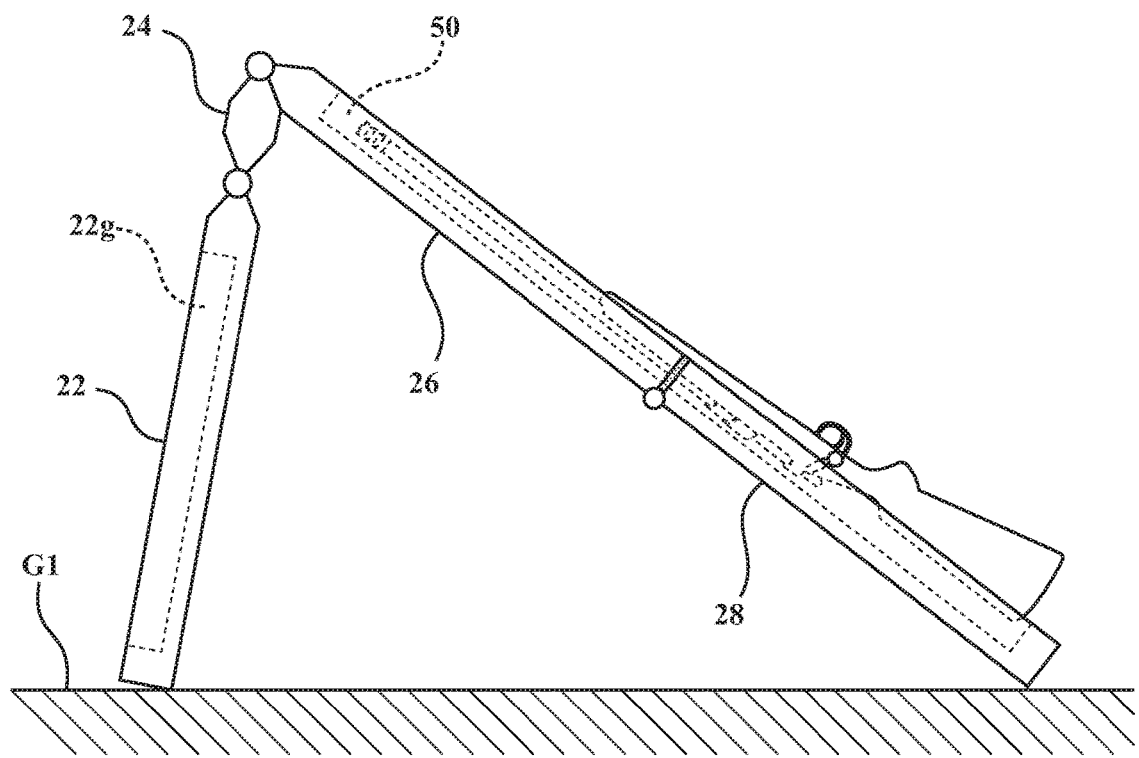
FIG. 9 is a schematic side view of the tonneau cover of FIGS. 1 and 2 showing the cover in a third alternative end-use configuration.

In one or more arrangements, the tonneau cover 20 may be configurable as shown in FIG. 9, with second and third cover panels 26, 28 secured by latches 48 to form a continuous straight portion of the tonneau cover and a continuous cavity 50 as previously described. First cover panel 22 and transition cover panel 24 may be secured to form another continuous straight portion of the tonneau cover, which may be secured at an angle with respect to the straight portion formed by second and third cover panels 26, 28. The configuration shown may also be positioned on a ground surface G1. The continuous cavity 50 may face in upwardly and outwardly to provide convenient access to items (such as guns) mounted in the cavity.

Figure 10:
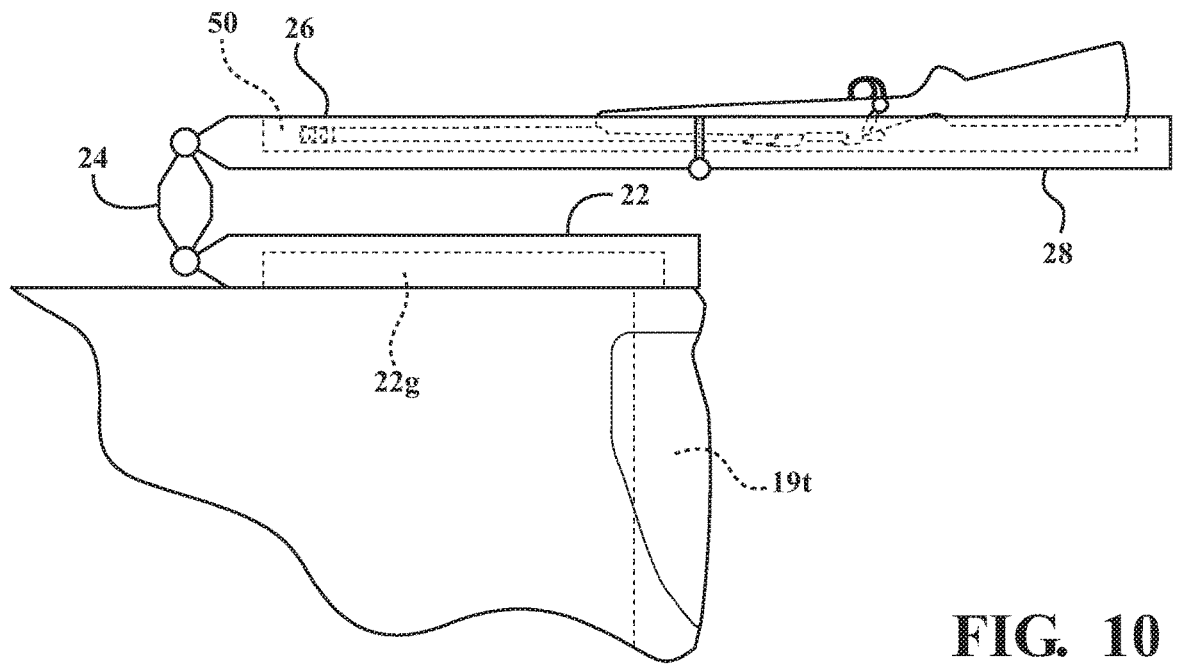
FIG. 10 is a schematic side view of the tonneau cover of FIGS. 1 and 2 showing the cover in a fourth alternative end-use configuration.

In one or more arrangements, the tonneau cover 20 may be configurable as shown in FIG. 10, with second and third cover panels 26, 28 secured by latches 48 to form a continuous straight portion of the tonneau cover and a continuous cavity 50. For this arrangement, the first cover panel 22 may be structured to be securable to the cargo bed walls adjacent a tailgate 19*t* of the truck 19, as well as to the walls of the cargo bed adjacent the cab 19*c*. The transition cover panel 24 and the second and third cover panels 26, 28 may be folded over as shown so that the cavity 50 faces upwardly to provide convenient access to items mounted in the cavity.

Figure 11:
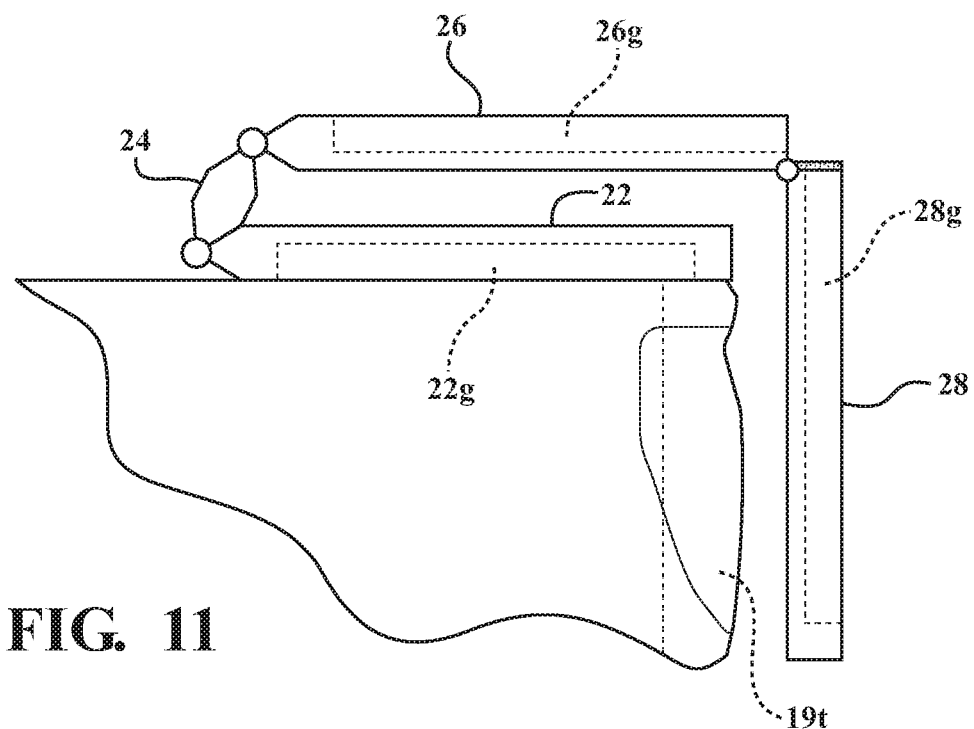
FIG. 11 is a schematic side view of the tonneau cover of FIGS. 1 and 2 showing the cover in a fifth alternative end-use configuration.

Referring to FIG. 11, in an arrangement similar to that shown in FIG. 10, the tonneau cover first cover panel 22 may be secured to the truck 19 and the transition and second cover panels 24, 26 folded over as previously described. However, the third cover panel 28 may be rotationally unsecured with respect to second cover panel 26, thereby allowing the third cover panel 28 to rotate downwardly and extend parallel to the closed tailgate 19*t* with the third cover panel cavity 28*g* facing away from the truck 19. This enables items such as a television to be mounted in the rearward-facing cavity 28*g* for viewing by users positioned behind the stationary truck 19. Alternatively, other items may be mounted in the cavity and conveniently accessed.

Figure 12:
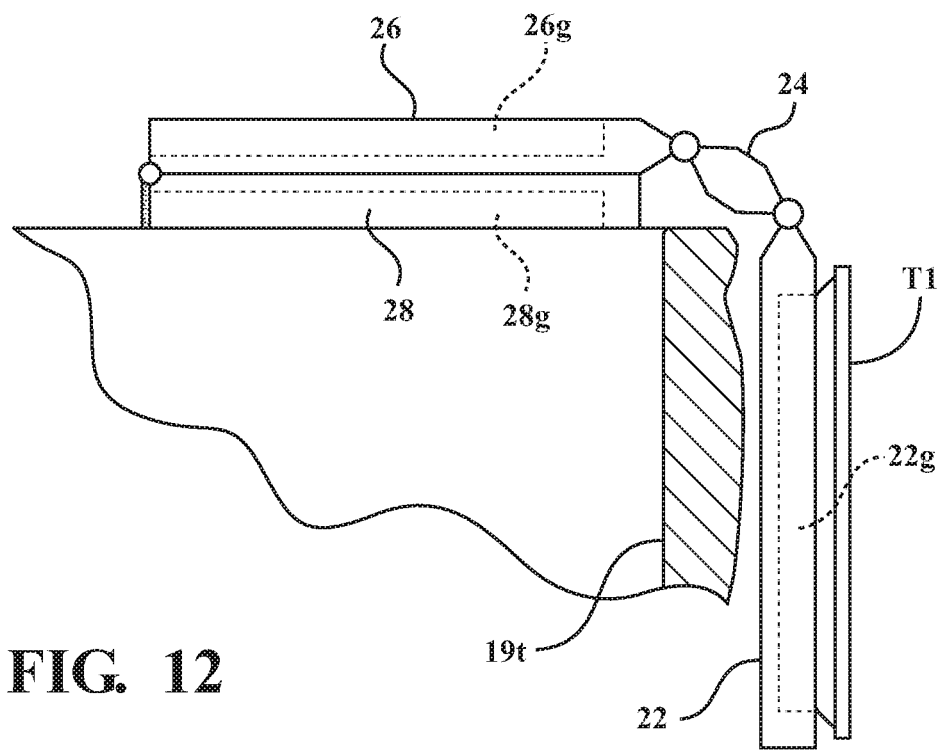
FIG. 12 is a schematic side view of the tonneau cover of FIGS. 1 and 2 showing the cover in a sixth alternative end-use configuration.

Referring to FIG. 12, in another arrangement similar to that shown in FIG. 10, the tonneau cover third cover panel 28 may be secured to the truck 19 adjacent the tailgate 19*t*, and the second cover panel 26 may be folded over on top of the third cover panel 28. The transition cover panel 24 and the first cover panel 22 may then be left rotationally unsecured with respect to each other and with respect to the second and third cover panels 26, 28. Thus, the transition cover panel 24 and the first cover panel 22 may rotate as shown to swing over the rear of the truck and the tailgate 19*t*, with the first cover panel 22 oriented to expose the first cover panel cavity 22*g* in which items (for example, a television T1) may be mounted.

It will be seen from the previous detailed description that embodiments of the tonneau cover described herein may be arranged into any of a variety of configurations useable inside the cab, on the cargo bed, or outside the vehicle.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A tonneau cover structured to cover a pickup truck cargo bed, the tonneau cover comprising:
    a first cover panel having an exterior surface along a first side of the first_cover panel;
    a transition cover panel connected to the first cover panel so as to be rotatable with respect to the first cover panel about a first axis of rotation, to a first side of a first reference plane extending through the first cover panel parallel to the first cover panel exterior surface and through the first axis of rotation, and so as to enable the transition cover panel to be rotatable to a second side of the first reference plane opposite the first side of the first reference plane; and
    a second cover panel rotatably connected to the transition cover panel so as to be rotatable with respect to the transition cover panel about a second axis of rotation, to a first side of a second reference plane extending through both the first axis of rotation and the second axis of rotation, and also to a second side of the second reference plane opposite the first side of the second reference plane.

2. The tonneau cover of claim 1 further comprising a third cover panel connected to the second cover panel so as to be rotatable with respect to the second cover panel about a third axis of rotation.

3. The tonneau cover of claim 2 further comprising a securement mechanism structured to enable securement of one of the second cover panel and the third cover panel with respect to the other one of the second cover panel and the third cover panel so as to prevent rotation of the one of the second cover panel and the third cover panel with respect to the other one of the second cover panel and the third cover panel.

4. The tonneau cover of claim 3 wherein the second cover panel has an exterior surface along a first side of the second cover panel, and a first cavity formed along a second side of the second cover panel opposite the second cover panel first side, wherein the third cover panel has an exterior surface along a first side of the third cover panel, and a second cavity formed along a second side of the third cover panel opposite the third cover panel first side, and wherein the first cavity and the second cavity are structured so as to form a single continuous cavity extending between the second cover panel second side and the third cover panel second side when the one of the second cover panel and the third cover panel is secured with respect to the other one of the second cover panel and the third cover panel so as to prevent rotation of the one of the second cover panel and the third cover panel with respect to the other one of the second cover panel and the third cover panel.

5. The tonneau cover of claim 1 further comprising a securement mechanism structured to enable securement of the transition cover panel in a rotational position along the first side of the first reference plane, and also to enable securement of the transition cover panel in a rotational position along the second side of the first reference plane.

6. The tonneau cover of claim 1 further comprising a securement mechanism structured to enable securement of the second cover panel in a rotational position along the first side of the second reference plane, and also to enable securement of the second cover panel in a rotational position along the second side of the second reference plane.

7. The tonneau cover of claim 1 wherein the transition cover panel is connected to the first cover panel so as to enable the transition cover panel to be rotated to the first side of the first reference plane so as to form an angle of at least 120° between the first reference plane and the second reference plane, and so as to enable the transition cover panel to be rotated to the second side of the first reference plane so as to form an angle of at least 120° between the first reference plane and the second reference plane.

8. The tonneau cover of claim 1 wherein the tonneau cover is structured so that the first and second reference planes are coplanar or substantially coplanar when the tonneau cover is mounted to a pickup truck so as to cover the cargo bed.

9. The tonneau cover of claim 1 wherein a third reference plane is defined so as extend through the second axis of rotation and the second cover panel so as to be coplanar or substantially coplanar with the second reference plane when the tonneau cover is mounted to a pickup truck so as to cover the cargo bed, and wherein the second cover panel is connected to the transition cover panel so as to enable the second cover panel to be rotated to a first side of the second reference plane so as to form an angle of at least 120° between the third reference plane and the second reference plane, and to be rotated to a second side of the third reference plane so as to form an angle of at least 120° between the third reference plane and the second reference plane.

10. The tonneau cover of claim 1 further comprising a first cover panel cavity formed along a second side of the first cover panel opposite the first cover panel first side.

\* \* \* \* \*